June 7, 1949.  R. R. CROOKSTON  2,472,467

FRICTION LINING ASSEMBLY FOR BRAKE BANDS

Filed Aug. 19, 1946

Robert R. Crookston. INVENTOR.

BY

J. D. McKean
ATTORNEY.

Patented June 7, 1949

2,472,467

UNITED STATES PATENT OFFICE 2,472,467

FRICTION LINING ASSEMBLY FOR BRAKE BANDS

Robert R. Crookston, Houston, Tex., assignor, by mesne assignments, to Standard Oil Development Company, Elizabeth, N. J., a corporation of Delaware Application August 19, 1946, Serial No. 691,484

8 Claims. (Cl. 188—249)

The present invention is directed to an assembly adapted to be applied to brake bands to present a friction lining to the brake drum upon the contraction of the brake band in usual operation. The assembly of the present invention is particularly adapted to be used with brake bands of large magnitude, such as the brake bands employed for controlling the rate of rotation of large hoisting drums.

The device of the present invention may be briefly described as involving a brake band assembly which allows the friction surfaces to be readily applied or removed from the brake band mounted adjacent a brake drum without dismounting the brake band. The brake band assembly of the present invention is arranged so that when the brake band is loose on the brake drum, to allow free rotation of the brake drum, a unit or units on the friction elements may be removed therefrom and be replaced by other units. This arrangement allows worn friction lining to be readily and conveniently replaced with fresh friction lining.

The assembly of the present invention will now be described in greater detail in conjunction with the drawing in which Fig. 1 is a view of a brake band assembly embodying the present invention;

Figure 1:
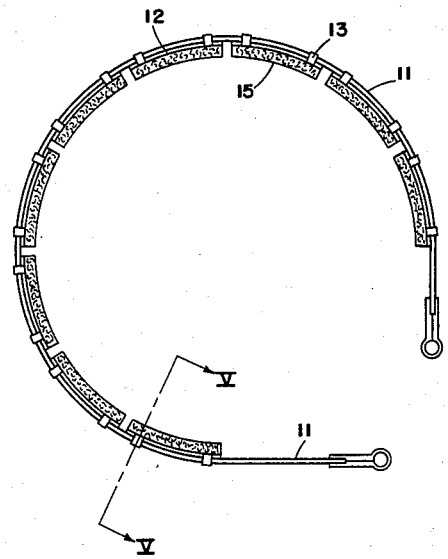
Figure 2:
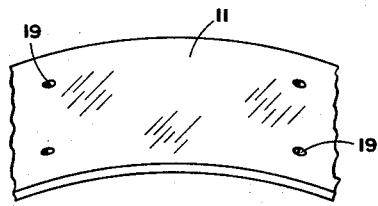
Fig. 2 is a view of the portion of the brake band shown in Fig. 1.
Figure 3:
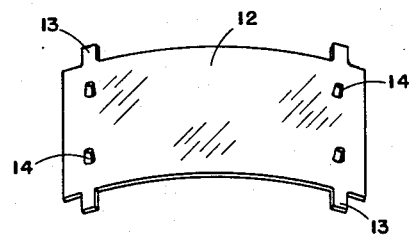
Fig. 3 is a view of the shim or plate portion of the brake band assembly shown in Fig. 1.
Figure 4:
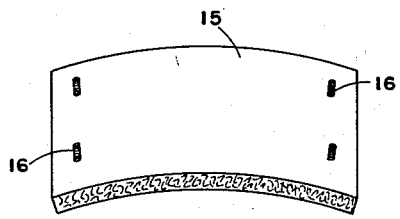
Fig. 4 is a view of the friction lining and screws of the brake band assembly of Fig. 1.

Turning now to the drawing and first to the embodiment of Figs. 1 to 5, the brake band 11 has secured to its inner surface a plurality of assembly units. Each brake band assembly unit consists of a plate or shim member 12 defining projections or ears 13 secured to the edges thereof and dowels 14 normal to the surface defined by unit 12. Dowel members 14 are secured to member 12 by suitable means, such as welding, and each dowel defines a passage having its axis coincident with that of the dowel and threaded to engage a screw. The friction lining sections 15 each have a surface corresponding in dimension to the surface of shim 12. The surfaces of the brake band shim and friction lining are all arcuate with the outside arcuate surface of lining 15 having the same curvature as the inner arcuate surface of shim 12 and the outer arcuate surface of shim 12 having the same curvature as the inner arcuate surface of brake band 11.

The shim member and friction lining member are secured together by screws 16. In order to allow such attachment, the friction lining defines passages 17 arranged to receive the screws with the inner arcuate side of friction lining member 15 defining counter-sunk openings 18 to receive the heads of screws 16. The passages 17 are spaced similarly to dowels 14 whereby the screws may be passed through friction lining member 15 and then engaged with dowels 14 to hold the friction lining and shim member together as an assembled unit.

Brake band 11 is provided with a plurality of spaced openings 19. The openings are of sufficient size to allow dowels 14 to be readily passed therethrough and are spaced to allow a plurality of shim members to be placed in position on the under side of the lining with the ends of the shim members adjacent each other when in position.

Figure 6:
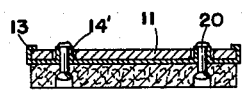
Fig. 6 is a fragmentary view of another embodiment of the invention.
Figure 5:
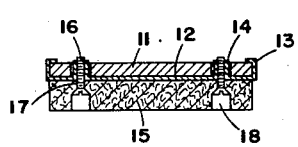
Fig. 5 is a view along line V—V of Fig. 1.

Another means for securing the friction lining member 12 is shown in Fig. 6. In this embodiment shim member 12 has dowel members 14' secured thereto in a manner similar to the embodiment previously described. Dowel members 14' differ from dowel members 14 of the previously described embodiment in defining passages without screw threads. The friction lining section 15 is secured to shim member 12 by rivets 20. It will be seen in the drawing that the counter-sunk openings 18 of the friction lining receive the heads of rivets 20, while the ends of the rivets project through dowel members 14' and are riveted in the conventional manner.

When applying a new friction lining to the brake band, friction lining sections are first attached to shim member sections. In the embodiment of Figs. 1 to 5, each friction lining section is attached to a shim member by screw 16; in the embodiment of Fig. 6 each friction lining section is attached to a corresponding shim section by rivets 20. It will be understood that the step of fastening the friction lining sections to the shim members may be carried out in a shop and that in field operations the procedure of replacing worn friction lining sections with new lining sections may be exactly the same when using either the embodiment of Figs. 1 to 5 or the embodiment of Fig. 6.

For the purpose of describing the steps of replacing worn friction lining with new sections of friction lining on the brake band, it will be assumed that the friction lining section shown in Fig. 1 are used sections to be replaced with new sections and that the brake band is applied to a brake drum, not shown in the drawing. One of the brake band assemblies including a friction lining section and shim member 12 is removed from the brake band by bending ears 13 into the same plane as the remainder of the shim surface, prying up the brake band immediately above the selected section until dowels 14 are clear of the brake band and then sliding the assembly between the inner surface of the brake band and the surface of the hoisting drum until the assembly clears the brake band. A new assembly including a new friction lining section 15 attached to shim member 12 is then placed in position by prying up the brake band assembly so that the brake band is clear of the dowels and sliding the assembly between the brake drum and the brake band until the dowels are lined up with holes 19 of the brake band whereupon the brake band assembly may be released and upon radial movement thereof toward the brake drum the dowels will project through the openings of the brake band as in Figs. 1, 5 and 6; the assembly is then secured to the brake band by bending the sections or ears 13 upwardly and around the brake band 11 to clench them to the brake band. Another used section is then removed in the same manner and replaced with a new section and the operation repeated until each of the used friction liner assemblies on the brake band have been replaced in turn by an assembly having a new friction lining section. In this way the entire lining of the brake band is readily replaced by new friction lining without dismounting the brake band from the brake drum.

While I have described a specific embodiment of the present invention, it will be obvious to a workman skilled in the art that changes in the shapes, sizes and proportions of the parts may be made without departing from the scope of the invention and it is my intention to embrace such changes in the claims appended hereto.

Having fully described and illustrated the present invention, what I desire to claim is:

1. An assembly adapted for attachment to a brake band defining an arcuate inner surface and spaced openings extending through the band substantially normal to said surface, comprising, in combination, an arcuate sheet member having a width coinciding with that of the brake band, its outer surface having a curvature corresponding to that of the inner surface of the brake band, dowel members secured to the outer surface of the sheet member and normal thereto, said dowels defining threaded passages and a friction lining member having an area coinciding with that of the inner surface of the sheet member and defining spaced perforations coinciding with the spacing of the threaded passages defined by the dowel members, and means arranged to engage with the threaded passages of the dowel members for securing the friction lining to the sheet member.

2. An assembly adapted for attachment to a brake band defining an arcuate inner surface and spaced openings extending through the band substantially normal to said surface, comprising, in combination, an arcuate sheet member of substantially the same width as the brake band, and its outer surface having a curvature corresponding to that of the inner surface of the brake band, dowel members secured to the outer surface of the sheet member and normal thereto, said dowels defining passages coinciding with the longitudinal axis thereof, and a friction lining member having an area of substantially the same dimensions as said sheet member and defining perforations coinciding with the spacing of the passages defined by the dowel members and means arranged to project through the spaced perforations of the friction member and the passages of the dowel members for securing the friction member with the sheet member.

3. A device in accordance with claim 2 in which said dowels define threaded passages and in which screws are arranged to engage with the threaded passages of the dowel members for securing the friction lining to the sheet member.

4. An assembly in accordance with claim 2 in which rivets are arranged to project through the passages defined by a dowel member and are secured to the sheet member by riveting.

5. A brake band assembly comprising, in combination, an arcuate brake band defining a plurality of spaced perforations extending through the band substantially normal to its inner surface, a plurality of sheet members each having substantially the same width as the brake band and having an outer arcuate surface having the same curvature as the inner surface of the brake band and defining a plurality of laterally extending projections adapted to be bent around the edges of the brake band to attach the sheet member to the brake band, a plurality of members normal to said outer surface spaced to coincide with perforations of the brake band and defining passages therethrough, a friction lining section having its outer surface coinciding with the inner surface of each sheet member and defining passages spaced to coincide with the passages defined by the members normal to the outer surface of said sheet member, and means securing each friction lining member to its corresponding sheet member.

6. A device in accordance with claim 5 in which the members normal to the sheet members define threaded passages and in which threaded screws secure each friction lining member to its corresponding sheet member.

7. A device in accordance with claim 5 in which each of the members normal to the sheet members defines a longitudinally extending passage and rivets are arranged to extend through the passage to secure each friction lining member to its corresponding sheet member.

8. A brake band assembly comprising, in combination, an arcuate brake band defining a plurality of spaced perforations extending through the band substantially normal to its inner surface, a plurality of sub-assemblies, each having substantially the same width and same curvature on its outer surface as the inside surface of the band, with outwardly extending projections normal to the outer surface and spaced to coincide with perforations of the brake band, each sub-assembly comprising a friction lining member and a sheet member secured thereto, said sheet member having laterally extending projections, each of said sub-assemblies being mounted on the brake band with its outer surface in contact with the inner surface of the band, the outwardly extending projections passing through corresponding spaced perforations of the band and said laterally extending projections bent around the edges of the brake band to attach the sub-assembly thereto.

ROBERT R. CROOKSTON.

(References on following page)

REFERENCES CITED

The following references are of record in the file of this patent:

UNITED STATES PATENTS

| Number | Name | Date |
|---|---|---|
| 1,903,723 | Palmer | Apr. 11, 1933 |
| 1,917,820 | Brackett | July 11, 1933 |
| 1,935,348 | Blume | Nov. 14, 1933 |
| 1,974,561 | Cunningham | Sept. 25, 1934 |
| 2,164,015 | Kateley | June 27, 1939 |
| 2,249,428 | Kempel | July 15, 1941 |

FOREIGN PATENTS

| Number | Country | Date |
|---|---|---|
| 203,356 | Great Britain | Sept. 7, 1923 |
| 243,495 | Great Britain | Dec. 3, 1925 |